United States Patent
Latva-Kokko et al.

(10) Patent No.: US 9,815,033 B2
(45) Date of Patent: Nov. 14, 2017

(54) STIRRED TANK REACTOR

(71) Applicant: Outotec (Finland) Oy, Espoo (FI)

(72) Inventors: Marko Latva-Kokko, Pori (FI); Teemu Ritasalo, Espoo (FI); Jussi Vaarno, Sundsberg (FI)

(73) Assignee: Outotec (Finland) Oy, Espoo (FI)

( * ) Notice: Subject to any disclaimer, the term of this patent is extended or adjusted under 35 U.S.C. 154(b) by 126 days.

(21) Appl. No.: 14/762,414

(22) PCT Filed: Jan. 29, 2014

(86) PCT No.: PCT/FI2014/050068
§ 371 (c)(1),
(2) Date: Jul. 21, 2015

(87) PCT Pub. No.: WO2014/118434
PCT Pub. Date: Aug. 7, 2014

(65) Prior Publication Data
US 2015/0352504 A1    Dec. 10, 2015

(30) Foreign Application Priority Data

Jan. 30, 2013  (FI) ..................................... 20135090

(51) Int. Cl.
*B01F 3/04*    (2006.01)
*B01F 15/00*    (2006.01)
(Continued)

(52) U.S. Cl.
CPC ...... *B01F 3/04531* (2013.01); *B01F 3/04517* (2013.01); *B01F 3/04588* (2013.01);
(Continued)

(58) Field of Classification Search
CPC .............. B01F 3/04517; B01F 3/04531; B01F 3/04588; B01F 3/04609; B01F 7/00641;
(Continued)

(56) References Cited

U.S. PATENT DOCUMENTS

| 1,854,754 A | 4/1932 | Morris |
| 2,521,396 A | 9/1950 | Moui |
| (Continued) | | |

FOREIGN PATENT DOCUMENTS

| CN | 1148998 A | 5/1997 |
| WO | 01/41919 A1 | 6/2001 |

OTHER PUBLICATIONS

Search report from corresponding International patent application No. PCT/FI2014/050068, dated May 20, 2014, 4 pgs.
(Continued)

*Primary Examiner* — Charles Bushey
(74) *Attorney, Agent, or Firm* — Chernoff Vilhauer LLC (57) ABSTRACT

The invention relates to a stirred tank reactor for gas-liquid mass transfer in a slurry. The reactor includes a reactor tank (1) having a first volume ($V_1$), a drive shaft (2) that extends vertically in the reactor tank, a motor (3) for rotating the drive shaft (2), a main impeller (4) which is a downward pumping axial flow impeller attached to the drive shaft (2) to create a main flow pattern in the reactor tank, and a gas inlet (5) arranged to supply gas into the reactor tank (1) to be dispersed to the liquid. The reactor includes a mechanical gas sparging apparatus (6) comprising a dispersion chamber (7) having a second volume ($V_2$) which is substantially smaller than the first volume ($V_1$) of the reactor tank (1), the dispersion chamber being arranged coaxial with the drive shaft (2), and the gas inlet (5) being arranged to feed gas into the dispersion chamber (7), and mixing means (8, 9, 10, 11, 12) arranged within the dispersion chamber (7) for mixing the gas into liquid by dispersing the gas to fine bubbles before the bubbles enter the main flow pattern. The mixing power per unit volume inside the dispersion chamber (7) is significantly larger than the mixing power elsewhere in the reactor.

16 Claims, 11 Drawing Sheets

(51) Int. Cl.
*B01F 7/06* (2006.01)
*B01F 7/00* (2006.01)
*B01F 7/18* (2006.01)
*B01F 7/22* (2006.01)

(52) U.S. Cl.
CPC ...... *B01F 3/04609* (2013.01); *B01F 7/00641* (2013.01); *B01F 7/06* (2013.01); *B01F 7/186* (2013.01); *B01F 7/22* (2013.01); *B01F 15/00538* (2013.01); B01F 2003/0468 (2013.01); B01F 2003/04645 (2013.01); B01F 2003/04673 (2013.01); B01F 2215/0463 (2013.01)

(58) Field of Classification Search
CPC .... B01F 7/06; B01F 7/186; B01F 7/22; B01F 15/00538; B01F 2003/04673; B01F 2003/0468; B01F 2003/04645; B01F 2215/0463
USPC ..................................... 261/91, 93
See application file for complete search history.

(56) References Cited

U.S. PATENT DOCUMENTS

| | | | |
|---|---|---|---|
| 3,814,396 A | 6/1974 | Di Gregorio et al. | |
| 3,827,679 A * | 8/1974 | Kaelin ................ | B01F 3/04099 210/219 |
| 4,066,722 A * | 1/1978 | Pietruszewski ..... | B01F 3/04241 210/219 |
| 4,643,852 A * | 2/1987 | Koslow ............... | B01F 3/04539 209/170 |
| 4,699,740 A | 10/1987 | Bollenrath | |
| 5,006,283 A * | 4/1991 | Schutte ............... | B01F 3/04262 261/123 |
| 5,108,662 A | 4/1992 | Litz et al. | |
| 5,244,603 A * | 9/1993 | Davis .................. | B01F 3/04539 261/87 |
| 5,454,986 A | 10/1995 | Lessen | |
| 5,972,661 A | 10/1999 | Kubera et al. | |
| 6,250,797 B1 | 6/2001 | Weetman | |
| 7,322,565 B2 * | 1/2008 | Buse ................... | B01F 3/04539 261/87 |
| 7,398,963 B2 * | 7/2008 | Hills ................... | B01F 3/04539 261/87 |
| 2013/0127073 A1 * | 5/2013 | Chevalier ........... | B01F 3/04539 261/87 |

OTHER PUBLICATIONS

Extended European Search Report prepared by the European Patent Office for EP 14746054; Sep. 16, 2016, 5 pages.
State Intellectual Property Office of the People's Republic of China, Notification of First Office Action, May 5, 2016, 8 pages, State Intellectual Property Office of the People's Republic of China, Beijing, China.

* cited by examiner

STIRRED TANK REACTOR

CROSS-REFERENCE TO RELATED APPLICATIONS

This is a national stage application filed under 35 USC 371 based on International Application No. PCT/FI2014/050068 filed Jan. 29, 2014 and claims priority under 35 USC 119 of Finnish Patent Application No. 20135090 filed Jan. 30, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a stirred tank reactor for gas-liquid mass transfer.

BACKGROUND OF THE INVENTION

In hydrometallurgical applications gas is usually fed to a stirred tank reactor below the agitator through a plain pipe. Gas is then dispersed to fine bubbles with powerful mixing. Required mixing power is typically at the range of 0.5-2 kW/m$^3$. Another option is to use some kind of a sparging means at the end of gas feed pipe. These spargers can be just drilled holes in a ring shape pipe or be made of some porous material. Idea is that feed gas is broken into smaller bubbles before they hit the agitator (impeller which creates the main flow pattern in the tank). This reduces slightly the power required for mixing. At hydrometallurgical applications this kind of devices are not very suitable, since they tend to block up easily. Further, the problem is that a substantially high pressure for the gas feed is needed because of a great pressure loss caused by the small holes or porous material.

A stirred tank reactor for gas-liquid mass transfer is known e.g. from document U.S. Pat. No. 5,108,662 which discloses a stirred tank reactor. A motor-driven drive shaft extends vertically in a reactor tank. A downward pumping axial flow impeller is attached to the drive shaft to create a main flow pattern in the reactor tank. A gas inlet is arranged to supply gas into the tank below the axial flow impeller to be dispersed to the liquid. The document proposes a separate mixing system for gas dispersion. The system can be placed outside the reactor tank or inside the tank at the surface. The problem is that the construction of this known gas sparging mechanism is complex and requires installation of at least two mixer mechanisms and electric motors for one stirred tank reactor. Further, only part of the fed gas enters the gas sparger mechanism.

OBJECT OF THE INVENTION

It is an object of the invention to provide a stirred tank reactor which has a simple structure for the gas sparging.

Further, it is an object of the invention to provide a stirred tank reactor which is able to provide a high gas-liquid mass transfer coefficient and an improved gas utilization degree.

Further, it is an object of the invention to provide a stirred tank reactor wherein the gas feed does not easily become blocked.

Further, it is an object of the invention to provide a stirred tank reactor wherein the gas feed does not need a high pressure.

BRIEF SUMMARY OF THE INVENTION

An aspect of the invention is a stirred tank reactor for gas-liquid mass transfer in a slurry. Slurry is a suspension of solid particles and liquid. The reactor includes a reactor tank having a first volume, a drive shaft that extends vertically in the reactor tank, a motor for rotating the drive shaft, a main impeller which is a downward pumping axial flow impeller attached to the drive shaft to create a main flow pattern in the reactor tank, and a gas inlet arranged to supply gas into the reactor tank to be dispersed to the liquid. According to the invention the reactor includes a mechanical gas sparging apparatus. The mechanical gas sparging apparatus comprises a dispersion chamber having a second volume which is substantially smaller than the first volume of the reactor tank, the dispersion chamber being arranged coaxial with the drive shaft, and the gas inlet being arranged to feed gas into the dispersion chamber. Mixing means is arranged within the dispersion chamber for mixing the gas into liquid by dispersing the gas to fine bubbles before the bubbles enter the main flow pattern. The mixing power per unit volume inside the dispersion chamber is significantly larger than the mixing power elsewhere in the reactor.

An advantage of the invention is that the mechanical gas sparging apparatus provides sparging of the gas in very fine bubbles with a simple structure. Further with the provision of the mechanical gas sparging apparatus the stirred tank reactor is able to provide a high gas-liquid mass transfer coefficient and an improved gas utilization degree. A further advantage of the invention is that the gas feed does not become easily blocked. The gas feed does not need a high pressure because it only needs to be greater than the hydrostatic pressure.

In an embodiment of the invention the mixing power per unit volume inside the dispersion chamber is greater than 0.25 kW/m$^3$.

In an embodiment of the invention the mixing power per unit volume inside the dispersion chamber is in the range 0.5-2 kW/m$^3$ while the mixing power elsewhere in the reactor tank outside the dispersion chamber is less than 0.5 kW/m$^3$.

In an embodiment of the invention the second volume of the dispersion chamber is less than 10% of the first volume of the reactor tank.

In an embodiment of the invention the main impeller has a first diameter and the dispersion chamber has a second diameter which is smaller than the first diameter.

In an embodiment of the invention the dispersion chamber comprises a wall defining a hollow inner space inside the wall, an upper end which is upwardly open and a lower end which is downwardly open.

In an embodiment of the invention the dispersion chamber is located below the main impeller.

In an embodiment of the invention the dispersion chamber is located above the main impeller.

In an embodiment of the invention the mixing means comprises a mixing element attached to the drive shaft.

In an embodiment of the invention the mixing element comprises an auxiliary impeller attached to the drive shaft to be rotatable with it and located in the inner space of the dispersion chamber.

In an embodiment of the invention the dispersion chamber is attached to the bottom or to the side wall of the reactor tank, so that the dispersion chamber is stationary.

In an embodiment of the invention the mixing element comprises baffles attached to the wall of the dispersion chamber in the inner space of the dispersion chamber. Preferably the baffles are vertical plates.

In an embodiment of the invention the dispersion chamber is attached to the drive shaft to be rotatable with it.

In an embodiment of the invention the dispersion chamber and the auxiliary impeller are attached to each other.

In an embodiment of the invention the dispersion chamber is attached to the main impeller.

In an embodiment of the invention the dispersion chamber is attached to the main impeller below the main impeller.

In an embodiment of the invention the dispersion chamber is attached to the main impeller below the main impeller to be rotatable with it. The mixing element comprises baffles attached to the wall of the dispersion chamber in the inner space of the dispersion chamber, and a stator element attached to the bottom of the reactor tank. The stationary stator element is arranged coaxially in relation to the dispersion chamber.

In an embodiment of the invention, for creating the main flow pattern, the reactor comprises two main impellers, a lower main impeller attached to the lower end of the drive shaft and an upper main impeller attached to the drive shaft at a distance above the lower main impeller. The dispersion chamber is attached to the drive shaft or to the lower main impeller above the lower main impeller and below the upper impeller. Therefore, the dispersion chamber is located between the lower and upper main impellers.

In an embodiment of the invention the dispersion chamber is attached to the bottom or to the side wall of the reactor tank. The mixing means comprises an auxiliary drive shaft that extends through the side wall or the bottom of the reactor tank to the inner space of the dispersion chamber, a second motor for rotating the auxiliary drive shaft. The mixing means comprises an auxiliary impeller attached to the auxiliary drive shaft and located in the inner space of the dispersion chamber.

In an embodiment of the invention the rotation axis of the auxiliary drive shaft is substantially vertical.

In an embodiment of the invention the rotation axis of the auxiliary drive shaft is substantially horizontal.

BRIEF DESCRIPTION OF THE SEVERAL VIEWS OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
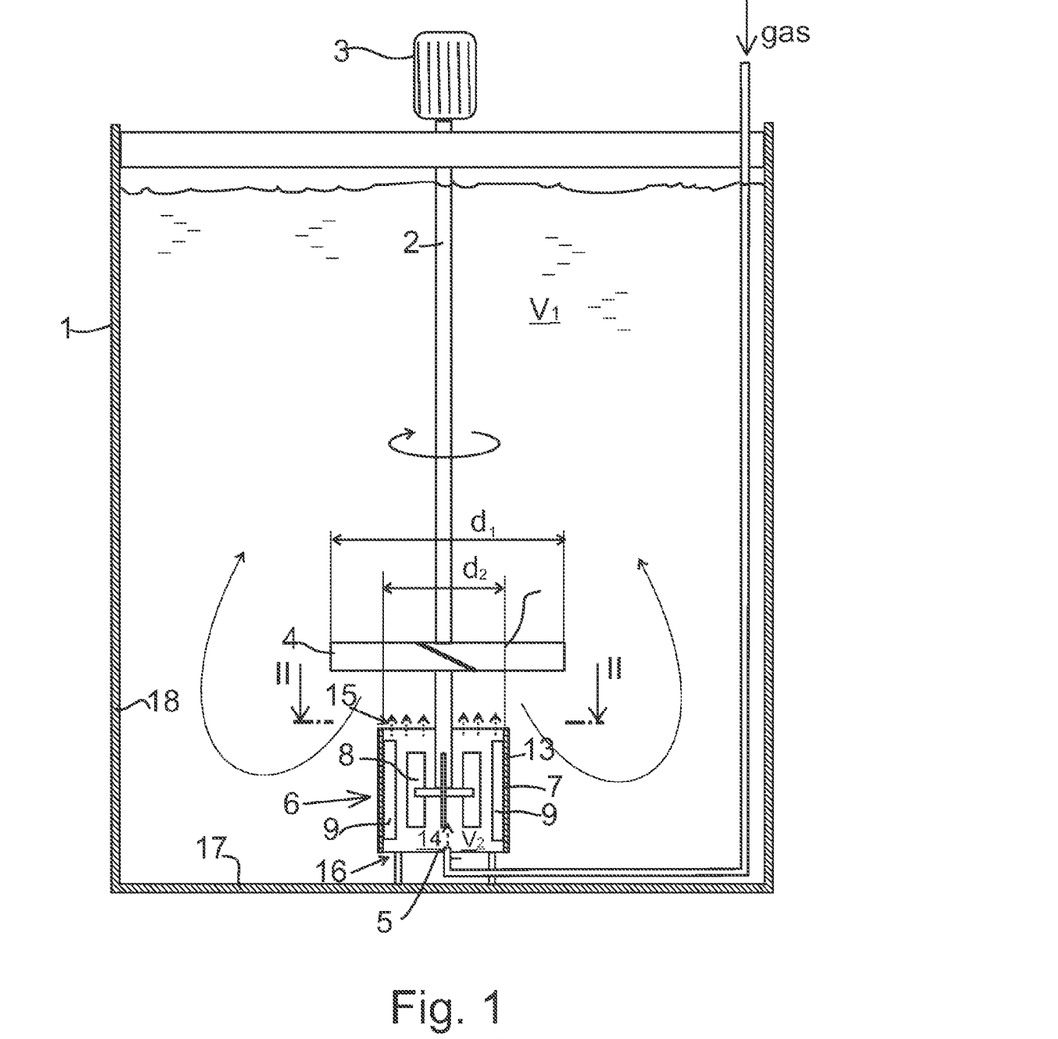
FIG. 1 is a side elevation view of the stirred tank reactor of a first embodiment of the invention.

FIG. 1 shows a stirred tank reactor for gas-liquid mass transfer in a slurry. The stirred tank reactor is to be used in hydrometallurgical applications. The stirred tank reactor may especially be a large scale industrial reactor.

The stirred tank reactor includes a reactor tank 1. The tank 1 is a vertical cylinder having a side wall 18 and a bottom 17. The tank 1 may also have vertical wall baffles (not shown) attached to its side wall 18. A drive shaft 2 extends vertically in the reactor tank 1. A motor 3 is arranged for rotating the drive shaft 2. A main impeller 4 is attached to the drive shaft 2 to create a main flow pattern in the reactor tank 1. The main impeller 4 is a downward pumping axial flow impeller. A gas inlet 5 is arranged to supply gas which is led to the tank via a pipeline and ends as a gas inlet 5 below the main impeller near the bottom 17 of the tank.

A mechanical gas sparging apparatus 6 is arranged below the main impeller 4 to disperse the gas fed from the gas inlet 5 to fine bubbles before the bubbles enter the main flow pattern. High intensity mixing provided by the mechanical gas sparging apparatus 6 disperses the gas to fine bubbles before the fine bubbles enter to the main flow pattern of the tank.

Figure 2:
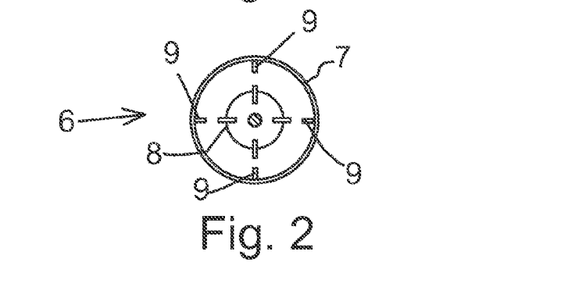
FIG. 2 is a cross-section II-II of FIG. 1.

As can be seen from FIGS. 1 and 2, the gas sparging apparatus 6 comprises a dispersion chamber 7. While the reactor tank 1 has a first volume $V_1$, the dispersion chamber 7 has a second volume $V_2$ which is substantially smaller than the first volume $V_1$. The second volume $V_2$ of the dispersion chamber 7 is preferably less than 10% of the first volume $V_1$ of the reactor tank 1. The dispersion chamber 6 is coaxial with the drive shaft 2 and the main impeller 4. The gas inlet 5 feeds gas into the dispersion chamber 6. An auxiliary impeller 8 is attached to the lower end of the drive shaft 2 to be rotatable with it. Therefore, the main impeller 4 and the auxiliary impeller 8 rotate with same rotational speed. The auxiliary impeller 8 is located in the inner space 14 of the dispersion chamber 7.

With this arrangement the mixing power per unit volume inside the dispersion chamber 7 is significantly larger than the mixing power elsewhere in the reactor. Preferably, the mixing power per unit volume inside the dispersion chamber 7 is greater than 0.25 kW/m$^3$, and more preferably the mixing power per unit volume inside the dispersion chamber 7 is in the range 0.5-2 kW/m$^3$ while the mixing power in the reactor tank 1 outside the dispersion chamber 7 is less than 0.5 kW/m$^3$. The main impeller 4 has a diameter $d_1$ and the dispersion chamber 7 has a second diameter $d_2$ which is smaller than the first diameter $d_1$. The main impeller 4 is always located outside the dispersion chamber 4.

The dispersion chamber 7 comprises a wall 13 which defines a hollow inner space 14 inside the wall. The dispersion chamber 7 has an upper end 15 which is upwardly open and a lower end 16 which is downwardly open. Although FIG. 2 shows a tubular dispersion chamber 7 having a circular cross-section (i.e. it is a cylinder with constant cross-section along its length), it must be understood that the cross-sectional shape of the dispersion chamber 7 is not limited to any particular shape. The cross-section of the dispersion chamber can have any shape and it may also vary in vertical direction.

In the embodiment of FIG. 1, the dispersion chamber 7 is attached to the bottom 17 or to the side wall 18 of the reactor tank 1 to be stationary. Baffles 9 are attached to the wall 13 of the dispersion chamber 7 in the inner space 14 of the dispersion chamber. The auxiliary impeller 8 shown in FIGS. 1 and 2 is a radial flow impeller (like Rushton turbine) comprising a flat disk which is attached to the drive shaft 2. Vertical flat blades are vertically mounted to the flat disk. The auxiliary impeller 8 can, however, be any kind of impeller that produces desired amount of mixing power per unit volume inside the dispersion chamber.

FIGS. 3 to 13 show different modifications of arrangement of the gas mechanical sparging apparatus 6. In the following features already disclosed in connection with FIGS. 1 and 2 are also applicable with the embodiments of FIGS. 3 to 13 and therefore are not repeated in the following disclosure.

Figure 3:
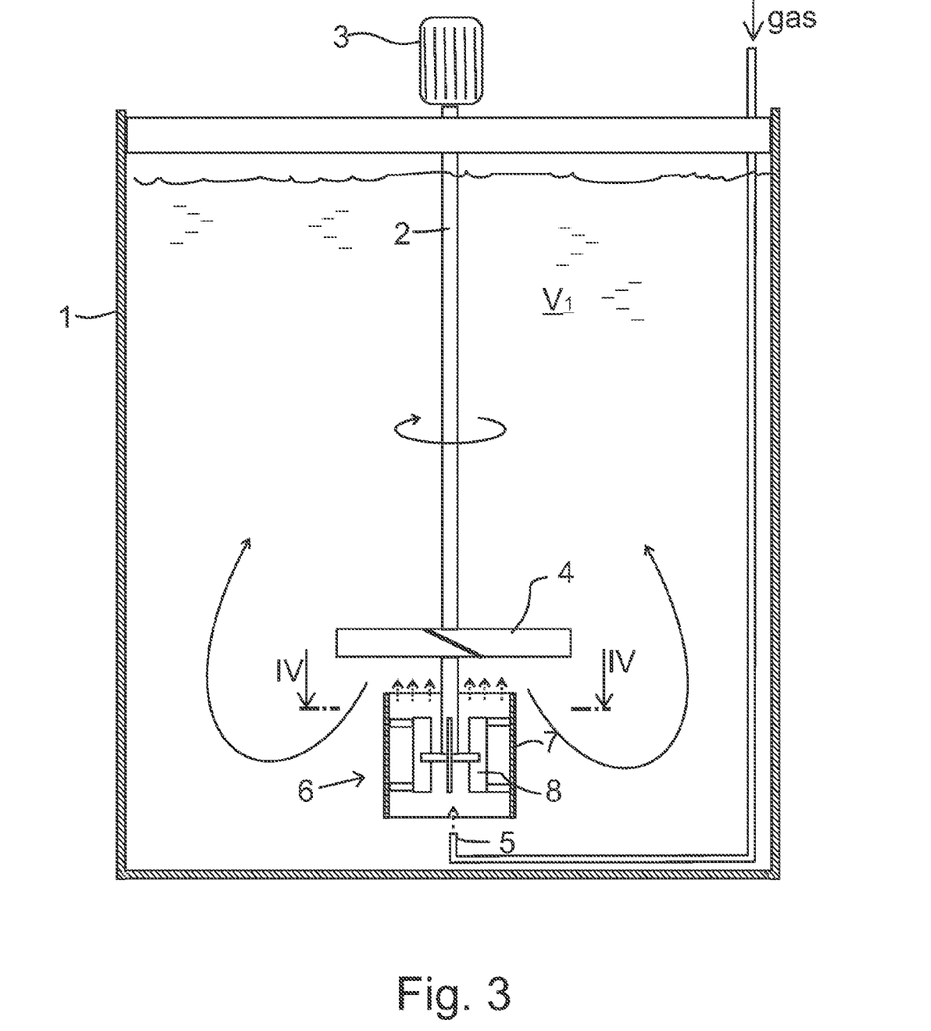
FIG. 3 is a side elevation view of the stirred tank reactor of a second embodiment of the invention.
Figure 4:
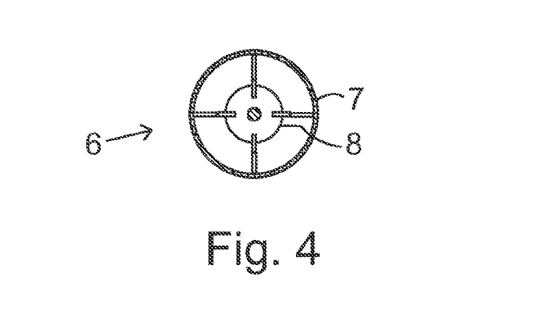
FIG. 4 is a side elevation view of the stirred tank reactor of a third embodiment of the invention.

FIGS. 3 and 4 show a modification of the arrangement of the mechanical gas sparging apparatus 6, like that in FIG. 1, which is arranged below the main impeller 4 to disperse the gas fed from the gas inlet 5 to fine bubbles before the bubbles enter the main flow pattern. High intensity mixing provided by the mechanical gas sparging apparatus 6 disperses the gas to fine bubbles before the fine bubbles enter to the main flow pattern of the tank. The difference in comparison with the embodiment of FIG. 1 is that in FIG. 3 the dispersion chamber 7 and the auxiliary impeller 8 are attached to each other and to the lower end of the drive shaft 2 so that the dispersion chamber 7 and the auxiliary impeller 8 rotate with the drive shaft 2.

Figure 5:
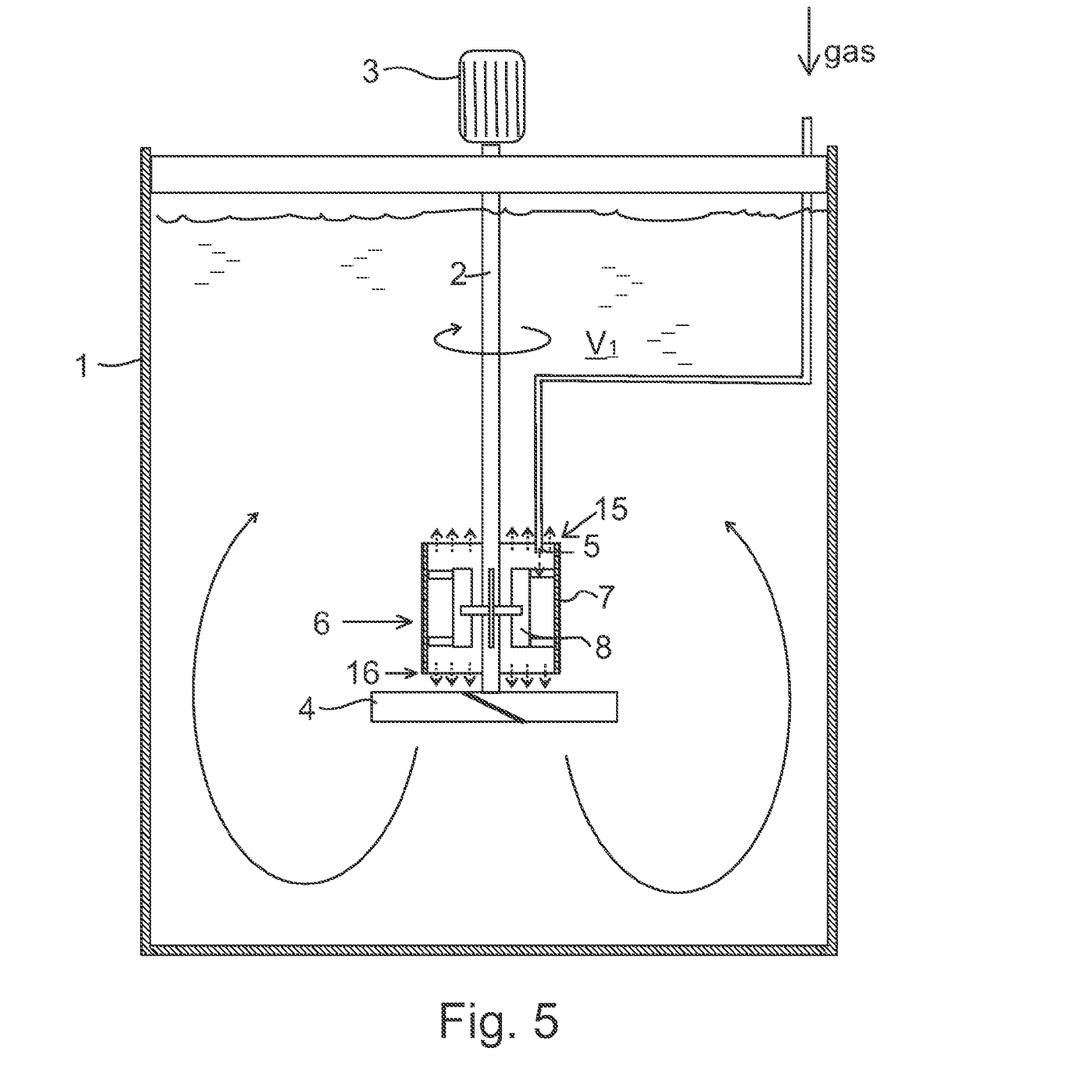
FIG. 5 is a side elevation view of the stirred tank reactor of a fourth embodiment of the invention.

FIG. 5 shows still another embodiment in which the mechanical gas sparging apparatus 6, like in FIG. 3, is arranged above the main impeller 4 to disperse the gas fed from the gas inlet 5 (which is now arranged at the upper end 15 of the dispersion chamber 7) to fine bubbles before the bubbles enter the main flow pattern. High intensity mixing provided by the mechanical gas sparging apparatus 6 disperses the gas to fine bubbles before the fine bubbles enter to the main flow pattern of the tank.

Figure 6:
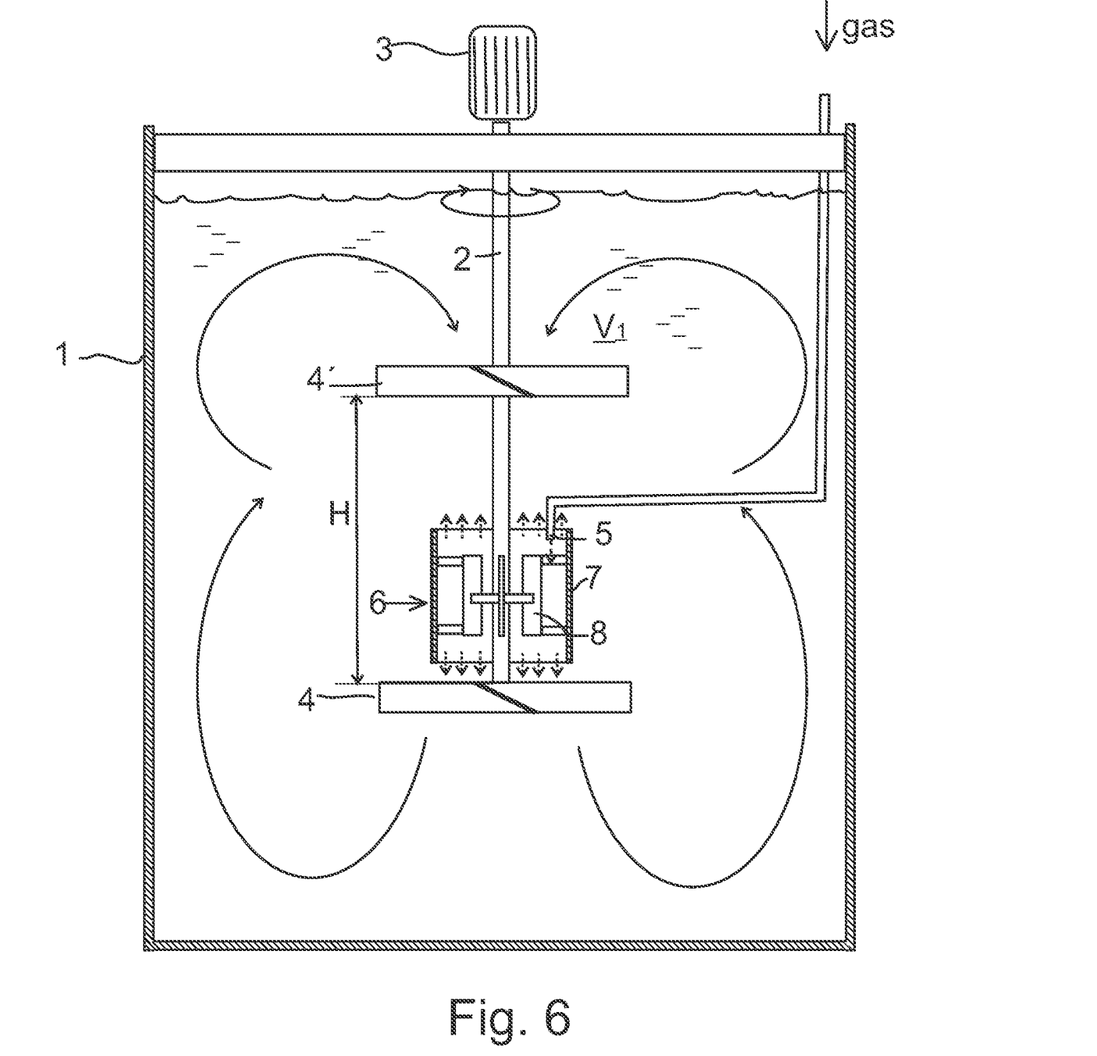
FIG. 6 is a side elevation view of the stirred tank reactor of a fifth embodiment of the invention.

FIG. 6 shows a further embodiment wherein the mechanical gas sparging apparatus 6, like in FIG. 5, is arranged above the main impeller 4 to disperse the gas fed from the gas inlet 5 (which is now arranged at the upper end 15 of the dispersion chamber 7) to fine bubbles before the bubbles enter the main flow pattern. An upper main impeller 4' is attached to the drive shaft 2 at a distance H above the lower main impeller 4. The dispersion chamber 7 is attached to the drive shaft 2 or to the lower main impeller 4 above the lower main impeller 4 so that the dispersion chamber 7 is located between the upper and lower main impellers. High intensity mixing provided by the mechanical gas sparging apparatus 6 disperses the gas to fine bubbles before the fine bubbles enter to the main flow pattern of the tank.

Figure 7:
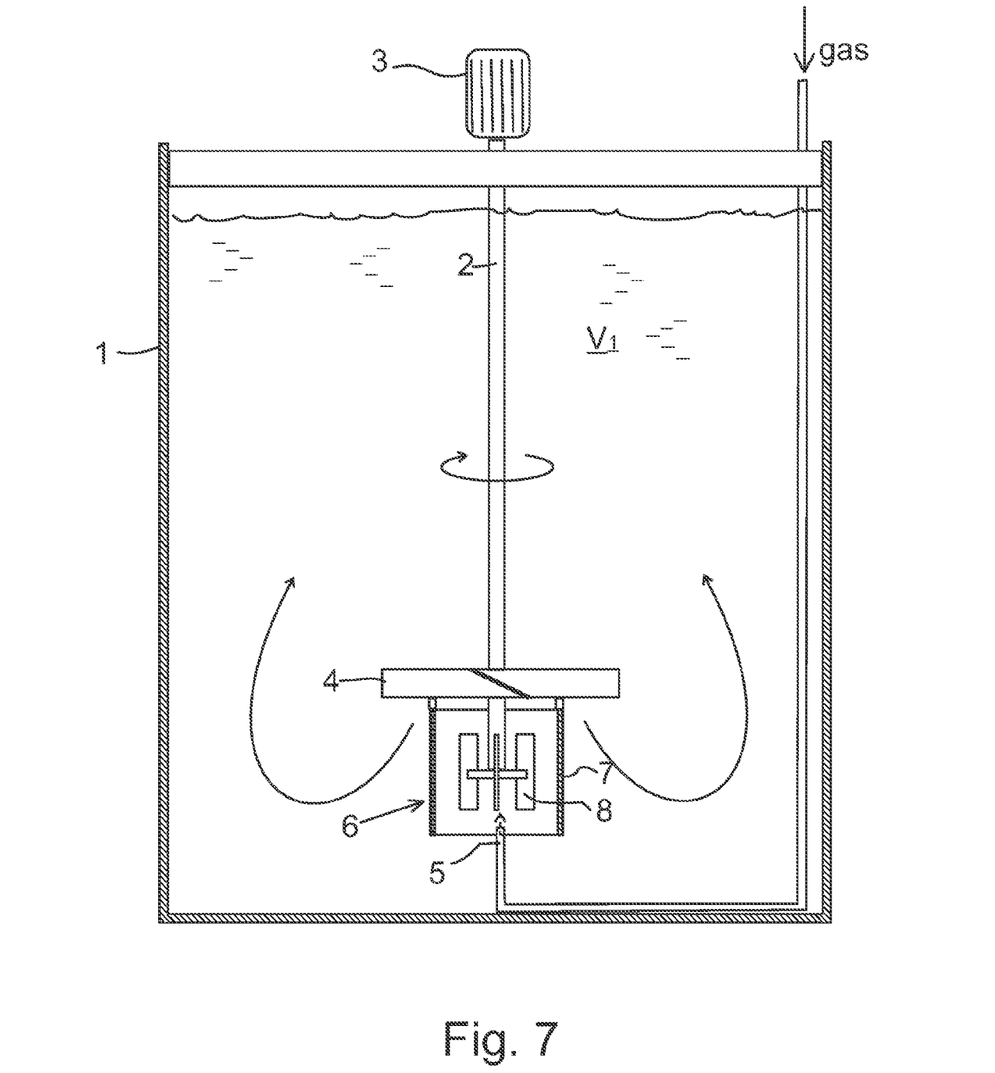
FIG. 7 is a side elevation view of the stirred tank reactor of a sixth embodiment of the invention.

FIG. 7 shows a further embodiment wherein the mechanical gas sparging apparatus 6, like that in FIG. 3, is attached to the main impeller 4 below the main impeller 4. In this embodiment the dispersion chamber 7 is not directly connected to the auxiliary impeller 8, but however rotates with the same rotational speed with it. High intensity mixing provided by the mechanical gas sparging apparatus 6 disperses the gas to fine bubbles before the fine bubbles enter to the main flow pattern of the tank.

Figure 8:
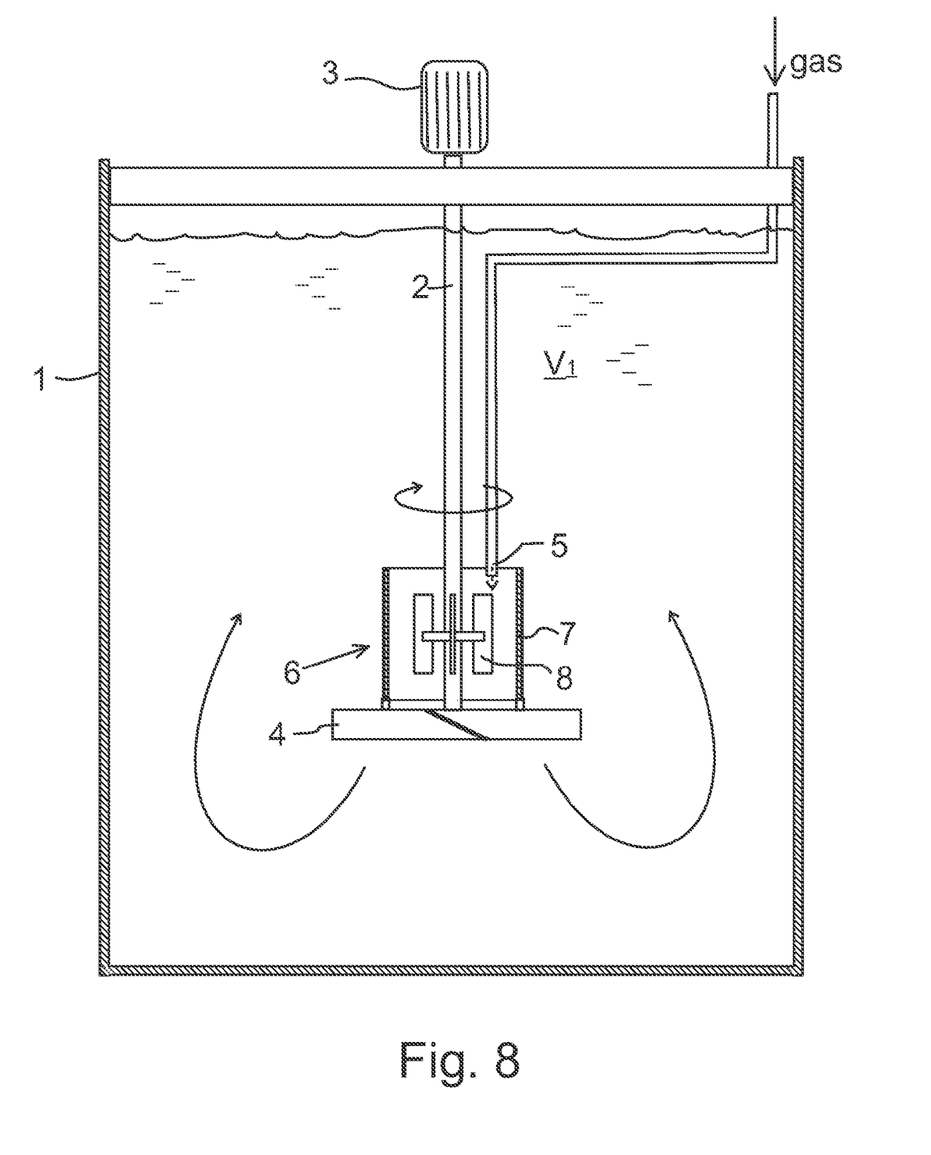
FIG. 8 is a side elevation view of the stirred tank reactor of a seventh embodiment of the invention.

FIG. 8 shows a further embodiment wherein the mechanical gas sparging apparatus 6, like that in FIG. 8, is attached to the main impeller 4 above the main impeller 4. Also in this embodiment the dispersion chamber 7 is not directly connected to the auxiliary impeller 8, but however rotates with the same rotational speed with it. High intensity mixing provided by the mechanical gas sparging apparatus 6 disperses the gas to fine bubbles before the fine bubbles enter to the main flow pattern of the tank.

Figure 9:
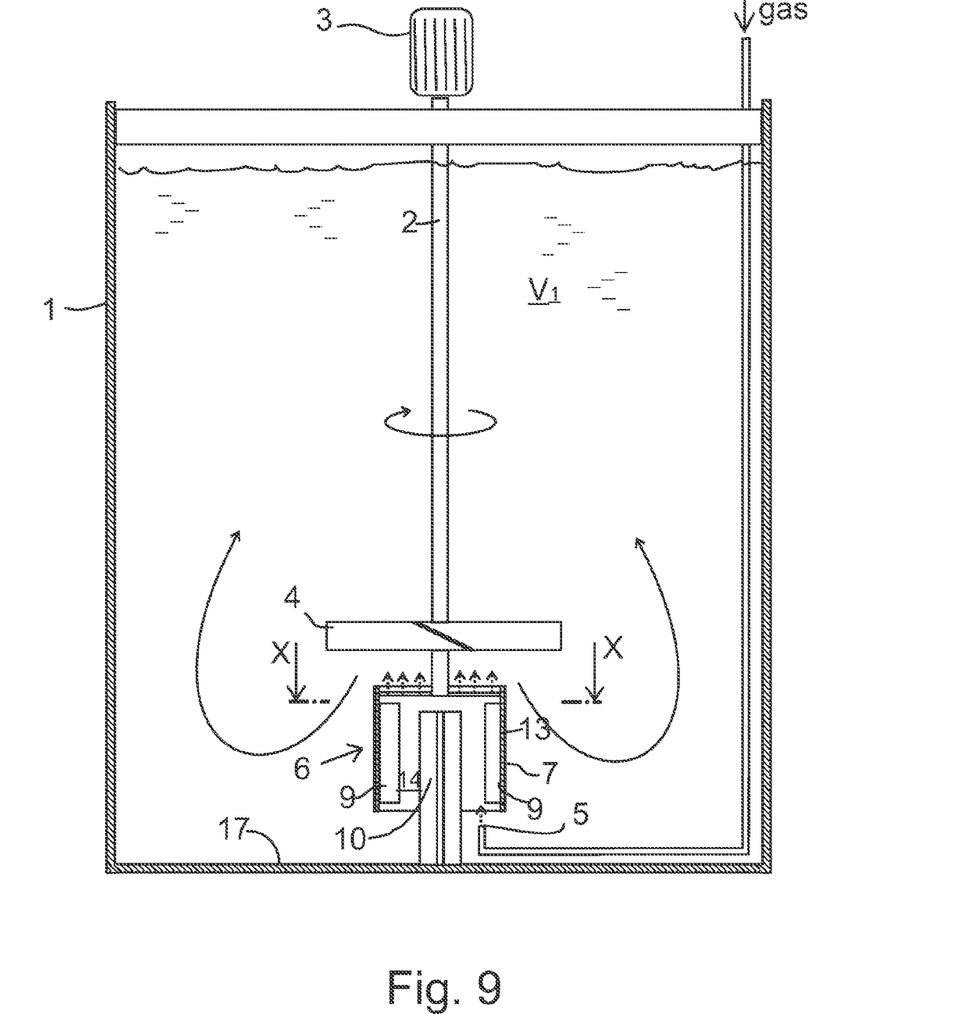
FIG. 9 is a side elevation view of the stirred tank reactor of a eighth embodiment of the invention.
Figure 10:
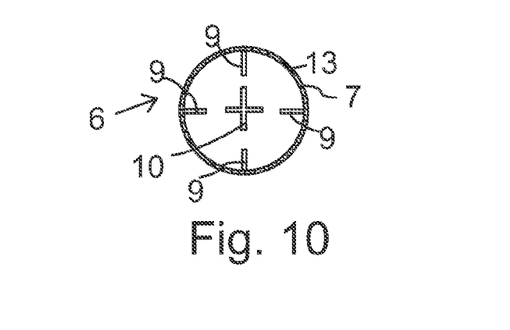
FIG. 10 is a cross-section X-X of FIG. 9.

FIGS. 9 and 10 show a further embodiment wherein the mechanical gas sparging apparatus 6 comprises the dispersion chamber 7 which is attached to the main impeller 4 below the main impeller to be rotatable with it. Baffles 9 are attached to the wall 13 of the dispersion chamber 7 in the inner space 14 of the dispersion chamber. A stator element 10 is attached to the bottom 17 of the reactor tank 1 to be stationary. The stator element 10 is coaxial in relation to the dispersion chamber 7. The stator element 10 may for example be a +− shaped vertical profile like that shown in FIG. 10 having four flanges angled with an angle of 90 degrees between the adjacent flanges. High intensity mixing provided by the mechanical gas sparging apparatus 6 disperses the gas to fine bubbles before the fine bubbles enter to the main flow pattern of the tank.

Figure 11:
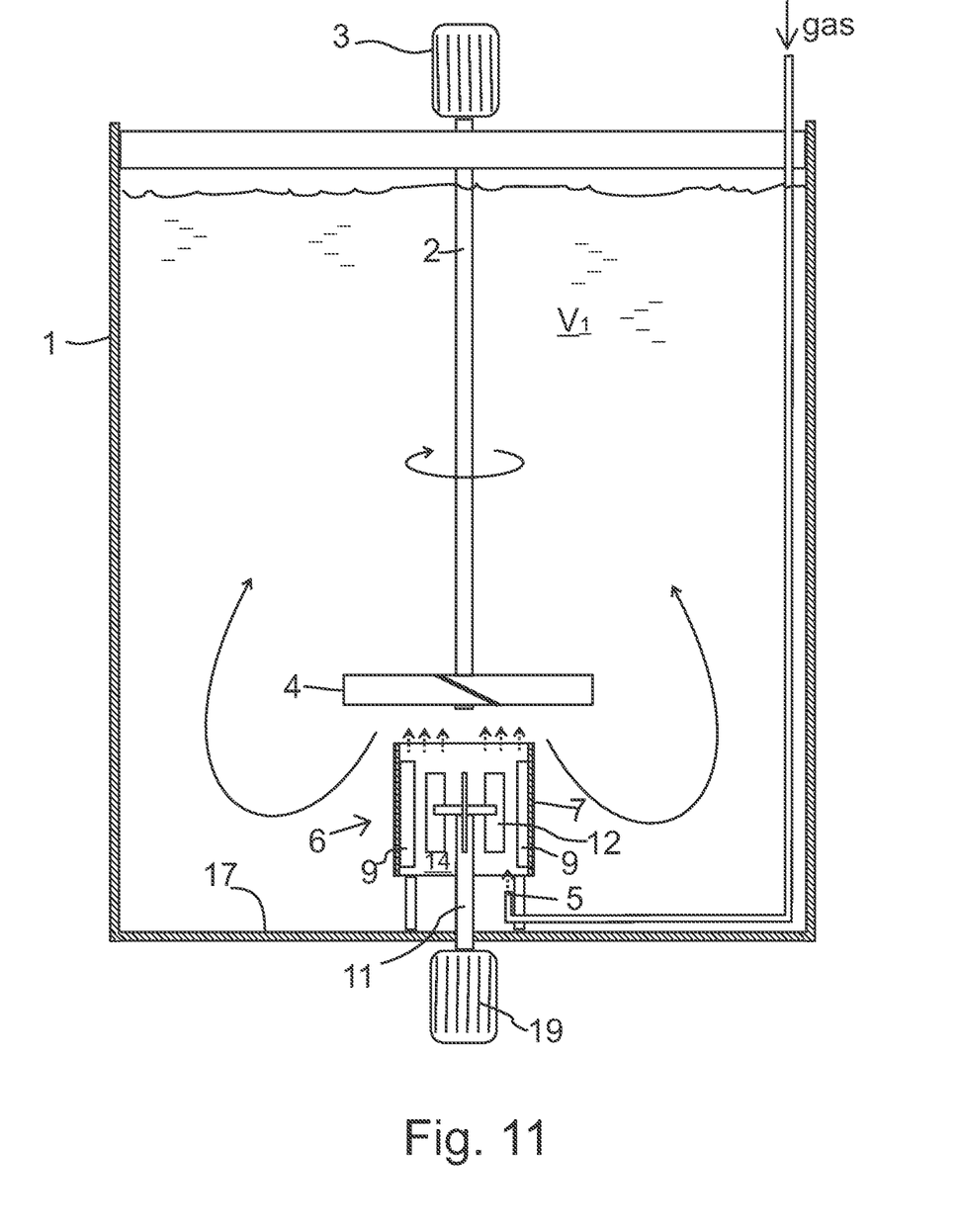
FIG. 11 is a side elevation view of the stirred tank reactor of a ninth embodiment of the invention.

FIG. 11 shows still a further embodiment wherein the mechanical gas sparging apparatus 6 comprises a dispersion chamber 7 which is attached to the bottom 17 of the reactor tank 1. An auxiliary drive shaft 11 extends through the bottom 17 of the reactor tank 1 to the inner space 14 of the dispersion chamber 7. A second motor 19 is arranged to rotate the auxiliary drive shaft 11. The second motor 19 is located outside the tank 1 and below the bottom 17 of the tank 1. An auxiliary impeller 12 is attached to the auxiliary drive shaft 11 and located in the inner space 14 of the dispersion chamber 7. The rotation axis of the auxiliary drive shaft 11 is substantially vertical. High intensity mixing provided by the mechanical gas sparging apparatus 6 disperses the gas to fine bubbles before the fine bubbles enter to the main flow pattern of the tank.

Figure 12:
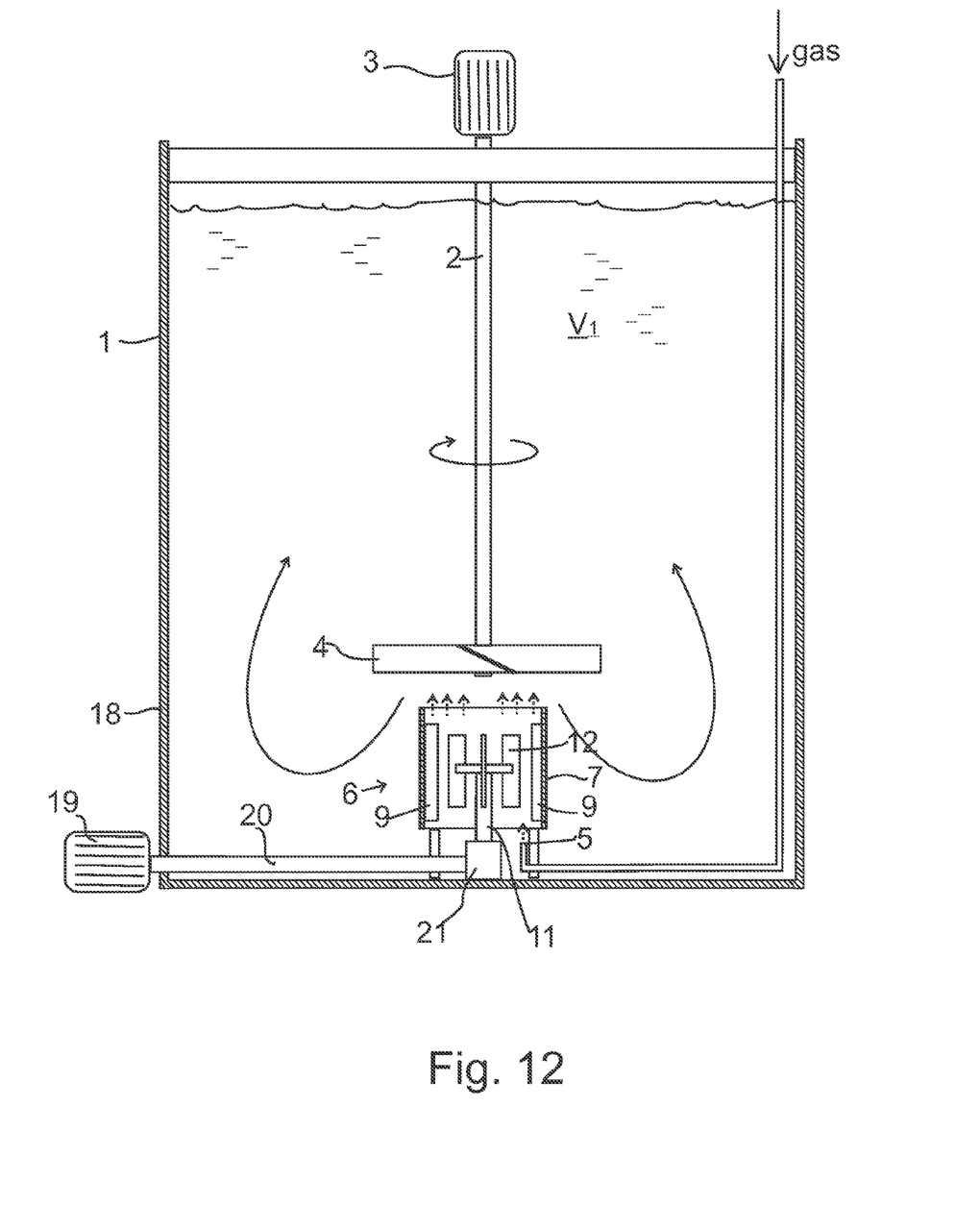
FIG. 12 is a side elevation view of the stirred tank reactor of a tenth embodiment of the invention.
Figure 13:
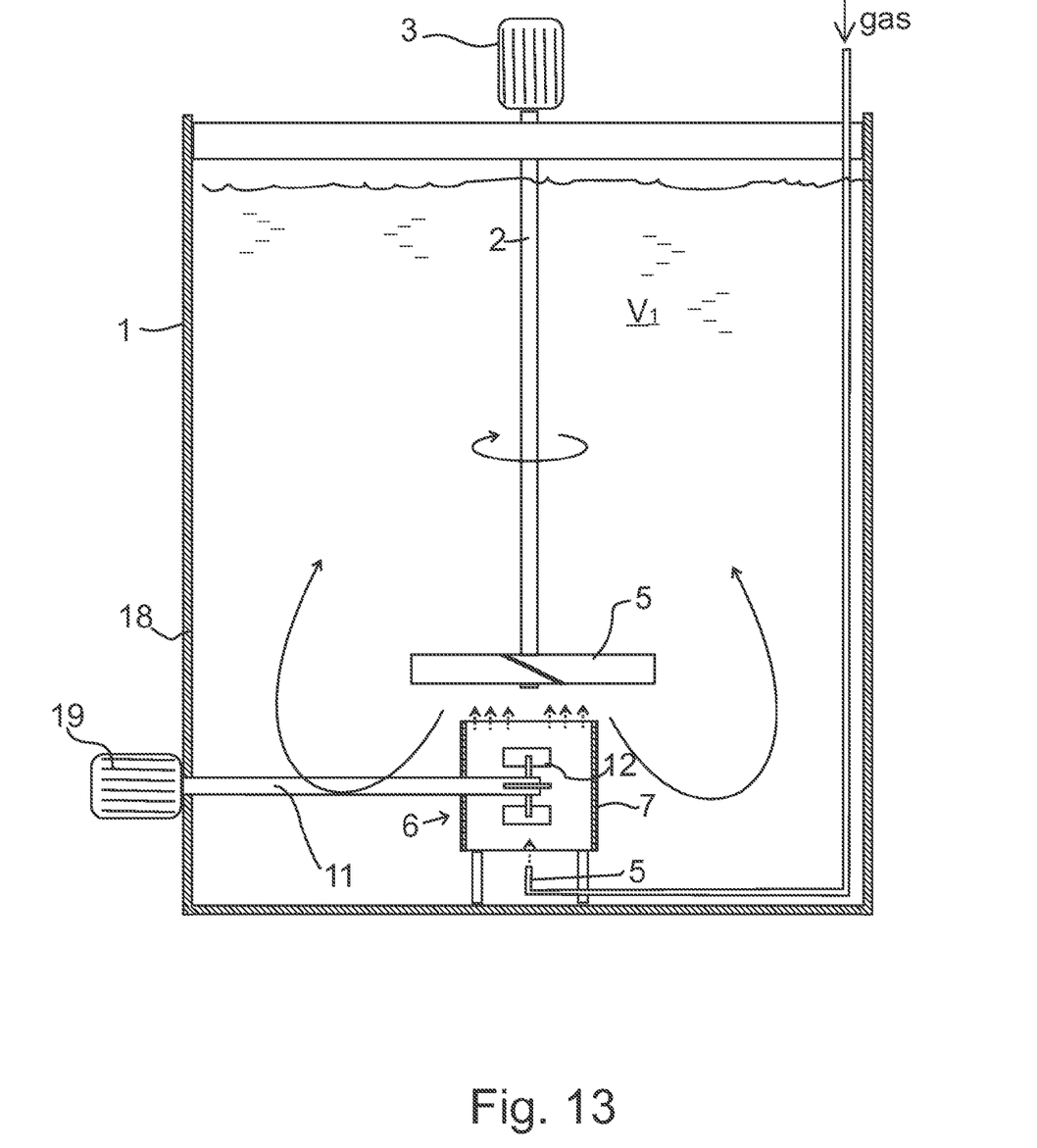
FIG. 13 is a side elevation view of the stirred tank reactor of an eleventh embodiment of the invention.

FIG. 12 shows still a further embodiment wherein the mechanical gas sparging apparatus 6 comprises a dispersion chamber 7 which is attached to the bottom 17 of the reactor tank 1. An auxiliary drive shaft 11 extends to the inner space 14 of the dispersion chamber 7. A second motor 19 is arranged to rotate the auxiliary drive shaft 11. The second motor 19 is located outside the tank 1 and beside the side wall 18 of the tank 1. An auxiliary impeller 12 is attached to the auxiliary drive shaft 11 and located in the inner space 14 of the dispersion chamber 7. The rotation axis of the auxiliary drive shaft 11 is substantially vertical. The second motor 19 rotates the auxiliary drive shaft 11 by a horizontal third drive shaft 20 via an angle transmission 21. High intensity mixing provided by the mechanical gas sparging apparatus 6 disperses the gas to fine bubbles before the fine bubbles enter to the main flow pattern of the tank.

FIG. 12 shows still a further embodiment wherein the mechanical gas sparging apparatus 6 comprises a dispersion chamber 7 which is attached to the bottom 17 of the reactor tank 1. A horizontal auxiliary drive shaft 11 extends through the side wall 18 of the reactor tank 1 to the inner space 14 of the dispersion chamber 7. The rotation axis of the auxiliary drive shaft 11 is horizontal. A second motor 19 is arranged to rotate the auxiliary drive shaft 11. The second motor 19 is located outside the tank 1 and beside the side wall 18 of the tank 1. An auxiliary impeller 12 is attached to the auxiliary drive shaft 11 and located in the inner space 14 of the dispersion chamber 7. The rotation axis of the auxiliary drive shaft 11 is substantially vertical. The second motor 19 rotates the auxiliary drive shaft 11 by a horizontal third drive shaft 20 via an angle transmission 21. High intensity mixing provided by the mechanical gas sparging apparatus 6 disperses the gas to fine bubbles before the fine bubbles enter to the main flow pattern of the tank.

EXAMPLE

Figure 14:
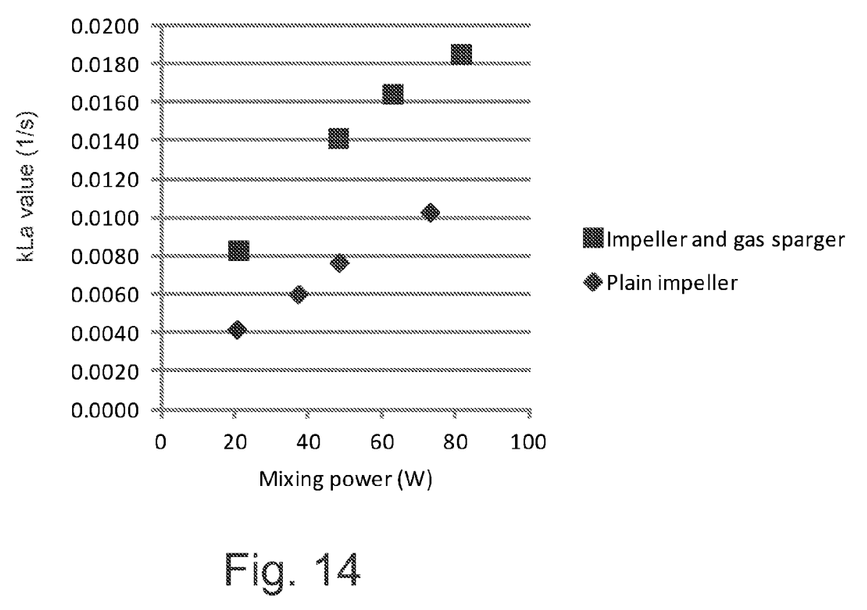
FIGS. 14 and 15 are graphs showing test results of experiments made with a stirred tank reactor with and without a mechanical gas sparging apparatus, FIG. 14 showing the volumetric mass transfer coefficient ($k_L a$-value) with different values of mixing power and Figure showing the and oxygen efficiency with different values of mixing power.
Figure 15:
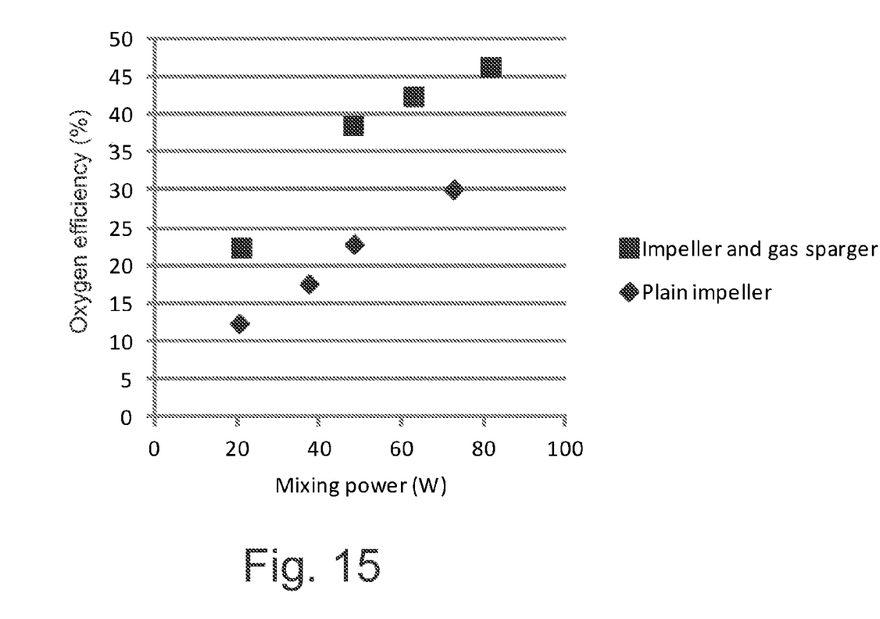

With reference to FIGS. 14 and 15, laboratory tests were made to show the advantageous effects of the invention. As an example of the invention sodium sulphite solution was oxidized in a cylindrical tank that had flat bottom and inner diameter of 780 mm. Tank was equipped with a rotating agitator, baffles and a gas feed was arranged below the impeller. Solution volume was 485 l, oxygen feed approximately 400 l/h and temperature was kept between 20-25° C. by cooling. Content of dissolved oxygen was monitored with a sensor that was submerged 20 cm below the solution surface. Rotation speed of the agitator was controlled with a frequency converter and power intake of the electric motor was monitored. Gas dispersion efficiency of different configurations was determined by measuring volumetric mass transfer coefficient ($k_L$a-value) and oxygen efficiency with different rotation speeds. Measurement of $k_L$a was based on steady state method in which oxidation of sodium sulphite to sodium sulphate is utilized to keep dissolved oxygen level constant during the test. Mass transfer coefficient is thus calculated based on stoichiometric oxygen consumption and time elapsed to the total consumption. Oxygen efficiency was determined based on theoretical need and actual feed of oxygen.

In first experiments a single downward pumping hydrofoil impeller was used as the main impeller. Impeller had three blades, diameter of 302 mm and it was placed on 272 mm distance from tank bottom. After these measurements a mechanical gas sparging apparatus described in this application (FIG. 1) was added below the same impeller. Height of the cylindrical dispersion chamber was 200 mm, diameter 200 mm and it was equipped with four baffle plates. Impeller rotating inside the dispersion chamber was a radial flow impeller with six blades attached to a flat disc. This impeller was attached to the same shaft below the main impeller. Its diameter was 120 mm, height 120 mm and blade width 30 mm.

Results of these experiments are shown in FIGS. 14 and 15. Gas dispersion efficiency was significantly increased by use of this mechanical gas sparging apparatus. For instance with 50 W mixing power input approximately 84% increase in kLa value and 68% improvement in oxygen efficiency was achieved.

In addition, some tests were conducted with the same two impeller design without the dispersion chamber. With this construction no significant improvement in gas dispersion efficiency with similar mixing power was observed when compared to experiments made with the single downward pumping hydrofoil impeller. This behavior confirms that the desired effect is achieved by feeding the gas through restricted zone where mixing intensity is significantly higher than elsewhere in the reactor as stated out in claims.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A stirred tank reactor for gas-liquid mass transfer in a slurry, including
    a reactor tank having a first volume,
    a drive shaft that extends vertically in the reactor tank,
    a motor for rotating the drive shaft,
    a main impeller which is a downward pumping axial flow impeller attached to the drive shaft to create a main flow pattern in the reactor tank, the main impeller having a first diameter,
    a gas inlet arranged to supply gas into the reactor tank to be dispersed to the liquid, and
    a gas sparging apparatus, characterized in that the gas sparging apparatus is mechanical and comprises
        a dispersion chamber comprising a wall defining a hollow inner space inside the wall, an upper end which is upwardly open and a lower end which is downwardly open, said dispersion chamber having a second diameter which is smaller than the first diameter of the main impeller, said dispersion chamber having a second volume which is greater than 0% of and less than 10% of the first volume of the reactor tank, and said dispersion chamber being arranged coaxial with the drive shaft, and the gas inlet being arranged to feed gas into the dispersion chamber, and
        mixing means arranged within the dispersion chamber for mixing the gas into liquid by dispersing the gas to fine bubbles before the bubbles enter the main flow pattern,
    whereby the mixing power per unit volume inside the dispersion chamber is significantly larger than the mixing power elsewhere in the reactor.

2. The reactor according to claim 1, characterized in that the dispersion chamber is located below the main impeller.

3. The reactor according to claim 1, characterized in that the dispersion chamber is located above the main impeller.

4. The reactor according to claim 1, characterized in that the mixing means comprises a mixing element attached to the drive shaft.

5. The reactor according to claim 4, characterized in that the mixing element comprises an auxiliary impeller attached to the drive shaft to be rotatable with it and located in the inner space of the dispersion chamber.

6. The reactor according to claim 1, characterized in that the dispersion chamber is attached to the bottom or to the side wall of the reactor tank to be stationary.

7. The reactor according to claim 6, characterized in that the mixing element comprises baffles attached to the wall of the dispersion chamber in the inner space of the dispersion chamber.

8. The reactor according to claim 1, characterized in that the dispersion chamber is attached to the drive shaft to be rotatable with it.

9. The reactor according to claim 5, characterized in that the dispersion chamber and the auxiliary impeller are attached to each other.

10. The reactor according to claim 9, characterized in that the dispersion chamber is attached to the main impeller.

11. The reactor according to claim 10, characterized in that the dispersion chamber is attached to the main impeller below the main impeller.

12. The reactor according to claim 1, characterized in that the dispersion chamber is attached to the main impeller below the main impeller to be rotatable with it; and that the mixing element comprises baffles attached to the wall of the dispersion chamber in the inner space of the dispersion chamber, and a stator element attached to the bottom of the reactor tank, the stator element being arranged coaxially in relation to the dispersion chamber.

13. The reactor according to claim 1, characterized in that for creating the main flow pattern the reactor comprises two main impellers, a lower main impeller attached to the lower end of the drive shaft and an upper main impeller attached to the drive shaft at a distance above the lower main impeller, and that the dispersion chamber is attached to the drive shaft or to the lower main impeller above the lower main impeller.

14. The reactor according to claim 1, characterized in that the dispersion chamber is attached to the bottom or to the side wall of the reactor tank; that the mixing means comprises an auxiliary drive shaft that extends through the side wall or the bottom of the reactor tank to the inner space of the dispersion chamber, a second motor for rotating the auxiliary drive shaft; and that the mixing means comprises an auxiliary impeller attached to the auxiliary drive shaft and located in the inner space of the dispersion chamber.

15. The reactor according to claim 14, characterized in that the rotation axis of the auxiliary drive shaft is substantially vertical.

16. The reactor according to claim 14, characterized in that the rotation axis of the auxiliary drive shaft is substantially horizontal.

* * * * *